J. H. WHAN.
EGG TURNING INCUBATOR.
APPLICATION FILED NOV. 2, 1915.

1,201,781.  Patented Oct. 17, 1916.

UNITED STATES PATENT OFFICE.

JAMES H. WHAN, OF PLAINS, KANSAS.

EGG-TURNING INCUBATOR.

1,201,781.    Specification of Letters Patent.    Patented Oct. 17, 1916.

Application filed November 2, 1915. Serial No. 59,211.

*To all whom it may concern:*

Be it known that I, JAMES H. WHAN, a citizen of the United States, and a resident of Plains, in the county of Meade and State of Kansas, have invented a new and Improved Egg-Turning Incubator, of which the following is a full, clear, and exact description.

Among the principal objects which the present invention has in view are: to provide an incubator wherein the eggs are continuously rolled while being subjected to the incubator heat; to provide means for transferring the chicks from the incubating trays to an observation chamber; and to provide means for so transferring without injury to the chicks.

*Drawings.*—Figure 1 is a longitudinal vertical section of an incubator constructed and arranged in accordance with the present invention, the section being taken on the median line of said incubator; Fig. 2 is a cross section of the same taken as on the line 2—2 in Fig. 1; Fig. 3 is a cross section taken as on the line 3—3 in Fig. 1.

*Description.*—As seen in the drawings. end framing rings 8 and 9 are connected by a series of trays 10, which are held in position by rods 11 extended between the two rings 8 and 9 and structurally united therewith. The trays 10 are each provided with a lid 12, said lids being normally held in closed position by springs 13. The trays 10 and the lids 12 are each semi-circular and correspond to form elongated cylinders of a size adapted to receive loosely the eggs to be treated. One end of each of the cylinders thus formed by the trays 10 and lids 12, is closed by the ring 8, while the other end is open, circles being formed in the ring 9 to permit egress from the cylinder.

The structure thus formed is supported within a house 14, by a series of rollers 15 extended inward from one end of said house, and by a driving shaft 16 extended inward from the other end of said house. The shaft 16 is fixedly attached to cross bars 17 bracing the ring 9. The shaft 16, as shown in the drawings, is supported by a clock casing 18 wherein a motor for driving the shaft 16 is contained. The casing 18 is held by a bracket 19 at the outer side of the house 14. Access to the house 14 is had by the door 20 or by the lifting cover 21. The cover 21 is hinged by a pin 22 to the house 14. Light is admitted to the house by a transparent window 23, through an orifice in which the shaft 16 extends, as shown best in Fig. 3 of the drawings.

The heat needed for incubating is furnished by heated water circulated through a tank 24, by pipes 25 and 26. The heat rays are distributed and prevented from rising too suddenly to the upper trays 10, by means of a hood 27, which, as shown best in Fig. 2 of the drawings, partially surrounds the tank 24.

The cylinders formed by the trays 10 and lids 12 open upon curved conveyers or chute sections 28 and 29. The section 28 is so disposed that if an object is delivered thereto, the latter is rolled or guided therefrom for transfer to the sections 29. The ends of the sections 29 are disposed to deliver any object conveyed thereby to a platform 30, which is normally held in position by a spring 31. The platform 30 is connected by a hinge 32 to one of the sections 29, as shown best in Figs. 2 and 3 of the drawings.

*Operation.*—The spring motor contained in the casing 18 having been wound and the cylinders formed by the trays 10 and lids 12 having been charged with eggs, the structure composed of the said cylinders and the rings 8 and 9 is slowly rotated on its axis, which is alined with the shaft 16. Water heated to the requisite degree is circulated by the pipes 25 and 26, within the tank 24, producing within the house and within the cylinders, a heat sufficient to incubate the eggs placed in the cylinders. When in the course of operation the chicks break their way through their shells, they are attracted by the light at the open end of the cylinders and are induced to make their way toward said open end. The window 23 is so disposed that the egg-containing cylinders are lighted when at the lowermost position, or when the chick in passing from the cylinder would fall directly upon the platform 30 with but a slight shock and without injury. It is designed. however, that if the chick is carried to the higher path of travel of the cylinders, that is above the section 28, having escaped from its respective cylinder, the chick will be rolled gently down one or the other side of the said section 28 and delivered to one or other of the sections 29 to be thereafter conveyed to and deposited upon the platform 30. The chick having arrived on the platform 30, the spring 31 yields to permit the said platform under the weight imposed thereon, to offer an inclined surface over which the chick is rolled for disposition upon the straw or other loose material 33 disposed at the bottom of the house 14. The platform 30 being relieved of its load, is immediately closed to the position shown in Figs. 2 and 3, by the spring 31. The chick thus deposited at the bottom of the house, is supplied with light, air, and heat, and space for necessary exercise, without being inconvenienced or injured by the presence of other chicks in close confinement, or by the unsanitary conditions necessarily prevailing in the cylinders.

Claims:

1. An incubator comprising a plurality of cylindrical egg containers circularly disposed and supported in juxtaposed relation by a pivotally mounted structure; means for slowly turning said structure on its pivot; and means disposed centrally to said containers for heating the same and the contents thereof.

2. An incubator comprising a plurality of cylindrical open-ended egg containers; a pivotally mounted supporting structure for said containers; means disposed centrally to said containers for heating the same and contents thereof; an inclosing house for said containers and supporting structure, said house providing space for exercise of chicks after escaping from said containers; and a plurality of conveyers adjacent the open ends of said containers for transferring the chick when escaping from said containers to said house and the portion thereof provided for the exercise of the chicks.

3. An incubator comprising a plurality of cylindrical open-ended egg containers; a pivotally mounted supporting structure for said containers; means disposed centrally to said containers for heating the same and contents thereof; an inclosing house for said containers and supporting structure, said house providing space for exercise of chicks after escaping from said containers; a plurality of conveyers adjacent the open ends of said containers for transferring the chicks when escaping from said containers to said house and the portion thereof provided for the exercise of the chicks; and yielding means for closing the delivery end of said conveyers.

JAMES H. WHAN.

Witnesses:
ADAH SENARD,
U. G. KING.